US012653253B2

(12) United States Patent
Huh et al.

(10) Patent No.: US 12,653,253 B2
(45) Date of Patent: Jun. 16, 2026

(54) MASK WITH DIAL

(71) Applicant: OTOS WING CO., LTD., Seoul (KR)

(72) Inventors: Moon Young Huh, Seoul (KR); Sung Won Huh, Seoul (KR)

(73) Assignee: OTOS WING CO., LTD., Seoul (KR)

( * ) Notice: Subject to any disclaimer, the term of this patent is extended or adjusted under 35 U.S.C. 154(b) by 724 days.

(21) Appl. No.: 17/991,994

(22) Filed: Nov. 22, 2022

(65) Prior Publication Data

US 2023/0292859 A1 Sep. 21, 2023

(30) Foreign Application Priority Data

Mar. 21, 2022 (KR) ........................ 10-2022-0034753

(51) Int. Cl.
*A41D 13/11* (2006.01)
*A62B 23/02* (2006.01)

(52) U.S. Cl.
CPC .......... *A41D 13/1161* (2013.01); *A62B 23/02* (2013.01)

(58) Field of Classification Search
CPC .... A41D 13/11–1192; A62B 23/00–02; A62B 7/00; A62B 7/10; A62B 9/00; A62B 9/09; A62B 18/00; A62B 18/02–025; A62B 18/08; A62B 18/084; A62B 18/088; A61M 16/0683
See application file for complete search history.

(56) References Cited

U.S. PATENT DOCUMENTS

| | | | | |
|---|---|---|---|---|
| 3,117,574 A | 1/1964 | Replogle | | |
| 2003/0051732 A1* | 3/2003 | Smith | ............... A61M 16/0633 128/206.27 | |
| 2015/0090254 A1* | 4/2015 | Pavalarajan | ........... A42B 3/286 128/201.23 | |
| 2015/0151070 A1 | 6/2015 | Capra | | |
| 2015/0283349 A1* | 10/2015 | McLaren | .............. A61M 16/06 128/206.21 | |
| 2017/0136269 A1 | 5/2017 | Jacotey | | |
| 2020/0171260 A1 | 6/2020 | McLaren | | |
| 2022/0163872 A1* | 5/2022 | Mitchell | ............ G02B 27/0176 | |
| 2022/0187609 A1* | 6/2022 | Snyder | ................. H04R 1/1066 | |
| 2022/0312882 A1* | 10/2022 | Roy | ..................... A62B 18/084 | |
| 2022/0409841 A1* | 12/2022 | Wagner | ............. A61M 16/0875 | |

FOREIGN PATENT DOCUMENTS

| | | |
|---|---|---|
| CN | 104955528 A | 9/2015 |
| JP | 2016519958 A | 7/2016 |
| JP | 2019198509 A | 11/2019 |

* cited by examiner

*Primary Examiner* — Rachel T Sippel
(74) *Attorney, Agent, or Firm* — Dinsmore & Shohl LLP; Yongsok Choi, Esq.

(57) ABSTRACT

A mask includes a main body arranged on a face of a wearer, a first dial provided on the main body, a first length member connected to the first dial, a length adjustment member spaced apart from the main body and arranged in a lengthwise direction of the first length member, and a second length member connected to the length adjustment member, wherein a length of the first length member is adjusted by an operation of the first dial, and a length of the second length member is adjusted by an operation of the length adjustment member.

9 Claims, 12 Drawing Sheets

MASK WITH DIAL

CROSS-REFERENCE TO RELATED APPLICATION

This application is based on and claims priority under 35 U.S.C. § 119 to Korean Patent Application No. 10-2022-0034753, filed on Mar. 21, 2022, in the Korean Intellectual Property Office, the disclosure of which is incorporated by reference herein in its entirety.

BACKGROUND

1. Field

One or more embodiments relate to a mask, and more particularly, to a mask provided with a dial.

2. Description of the Related Art

In general, a worker carrying out a work such as welding is exposed to harmful substances such as dust, and thus, the worker wears a mask on his/her face in order to block harmful substances from entering the respirator through the mouth and nose.

In addition, the work such as welding is performed for a long period of time, and the worker has to wear the mask on his/her face for a long period of time until the work is done. Also, because the worker wears the mask as close to his/her face as possible in order to block the harmful substances, the worker has a difficulty in sufficiently breathing or having a conversation with the mask on his/her face.

Accordingly, the worker has to frequently take off the mask in order to take a break or have a conversation during the work, and then, wear the mask again to get back to work. Here, the time for the worker to be exposed to the harmful substances has to be reduced as much as possible, and thus operations of manipulating the mask for taking off and re-wearing the mask have to be simplified and easy. Also, a distance of the mask from the face of the worker has to be maintained constantly so that the mask may not be completely separated from the worker while the worker takes off the mask.

SUMMARY

An embodiment of the present disclosure provides a mask that may be effectively and rapidly worn and taken off by a wearer.

Additional aspects will be set forth in part in the description which follows and, in part, will be apparent from the description, or may be learned by practice of the presented embodiments of the disclosure.

According to an embodiment of the present disclosure, provided is a mask including a main body arranged on a face of a wearer, a first dial provided on the main body, a first length member connected to the first dial, a length adjustment member spaced apart from the main body and arranged in a lengthwise direction of the first length member, and a second length member connected to the length adjustment member, wherein a length of the first length member is adjusted by an operation of the first dial, and a length of the second length member is adjusted by an operation of the length adjustment member.

The length of the first length member adjusted by the operation of the first dial may be less than the length of the second length member adjusted by the operation of the length adjustment member.

When the wearer wears the mask, the first length member may be arranged on the main body and may not be in contact with the face of the wearer.

The second length member may be arranged in the lengthwise direction of the first length member, and the mask may further include a connection member having one side connected to the first length member and the other side connected to the second length member.

The first dial may be provided on a center portion of the main body, and the connection member may be arranged on a side portion of the face of the wearer.

The length adjustment member may include a buckle.

The first length member may include a wire, and the second length member may include a strap or a band.

The mask may further include a second dial provided on the main body and arranged on chin of the wearer to be adjacent to the first dial, and a third length member connected to the second dial, wherein a length of the third length member may be adjusted by an operation of the second dial.

The second length member may be connected to one side of the length adjustment member, and the mask may further include a head band connected to the other side of the length adjustment member and surrounding the head of the wearer.

The mask may further include a fourth length member connected to the main body and the head band.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
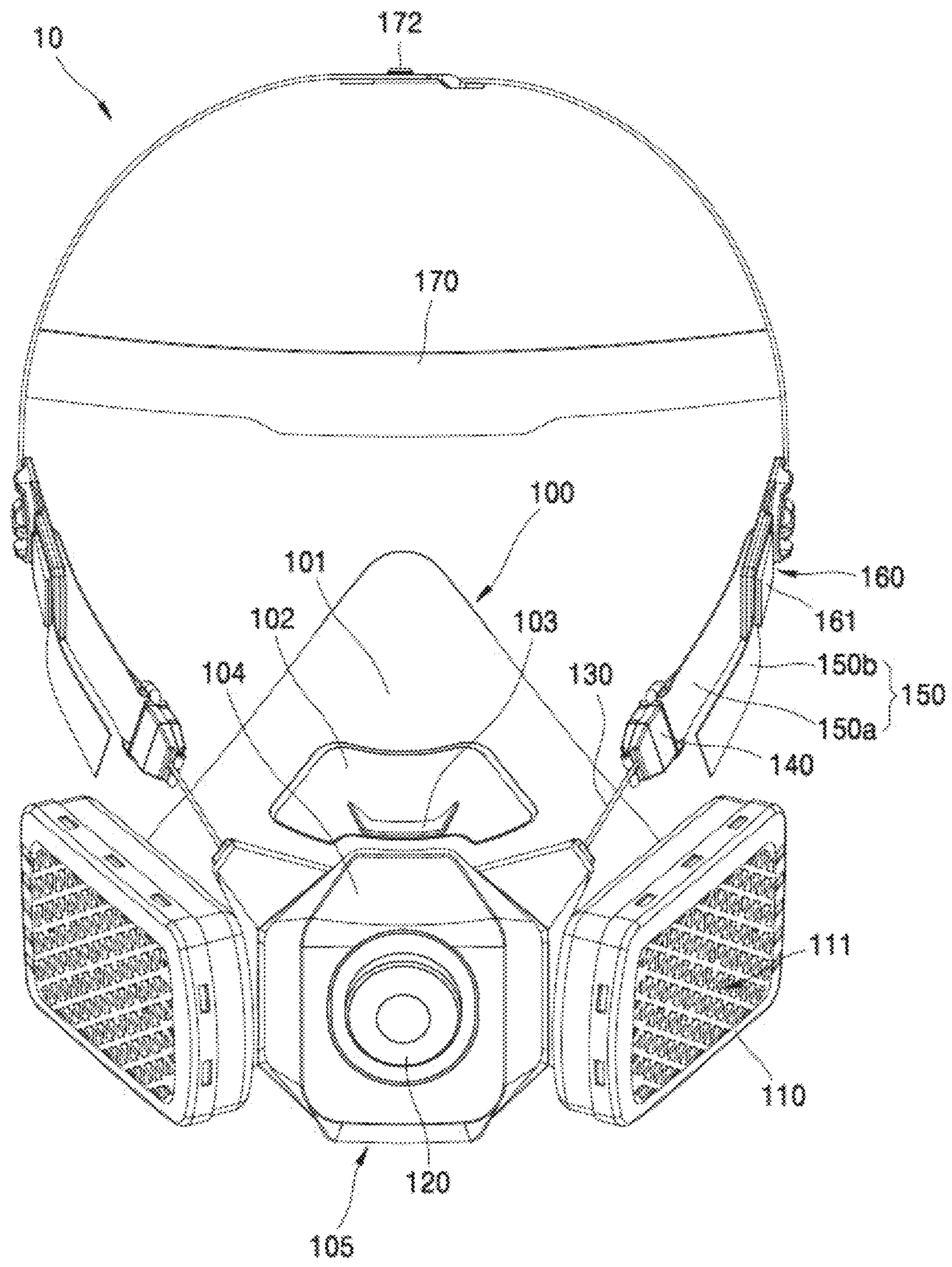
FIGS. 1 and 2 are a front view and a perspective view of a mask according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The exemplary embodiments will be described below in more detail with reference to the accompanying drawings. Those components that are the same or are in correspondence are rendered the same reference numeral regardless of the figure number, and redundant explanations are omitted.

A variety of modifications may be made to the inventive concept and there are various embodiments of the inventive concept, and particular embodiments will be illustrated in the drawings and described in detail in the written description. However, this is not intended to limit the technical scope of the present disclosure to particular modes of practice, and it is to be appreciated that all modifications, equivalents, and/or alternatives that do not depart from the spirit and technical scope are encompassed in the disclosure.

In the description of the technical scope of the disclosure, certain detailed explanations of the related art are omitted when it is deemed that they may unnecessarily obscure the essence of the embodiments of the disclosure. In addition, the number (e.g., first, second, etc.) used in the description herein is only an identifier for distinguishing one component from another.

In addition, in the specification, when an element is referred to as being "connected to" another element, it is to be understood that the element may be directly connected to the other element, but may be connected or connected via another element in the middle, unless otherwise described.

In addition, the terms such as " . . . unit", " . . . er", " . . . or", "module", etc. provided herein indicates a unit performing at least one function or operation.

In addition, it should be understood that constituent elements of the invention are merely distinguished according to their main functions. Specifically, two or more constituent elements which will be described later may be combined into one constituent element, or one constituent element may be divided into two or more constituent elements having more specified functions. Each constituent element which will be described later may additionally carry out some or all of the function of another constituent element in addition to its main function, or some of the main function of one constituent element may be carried out exclusively by another constituent element.

Figure 2:
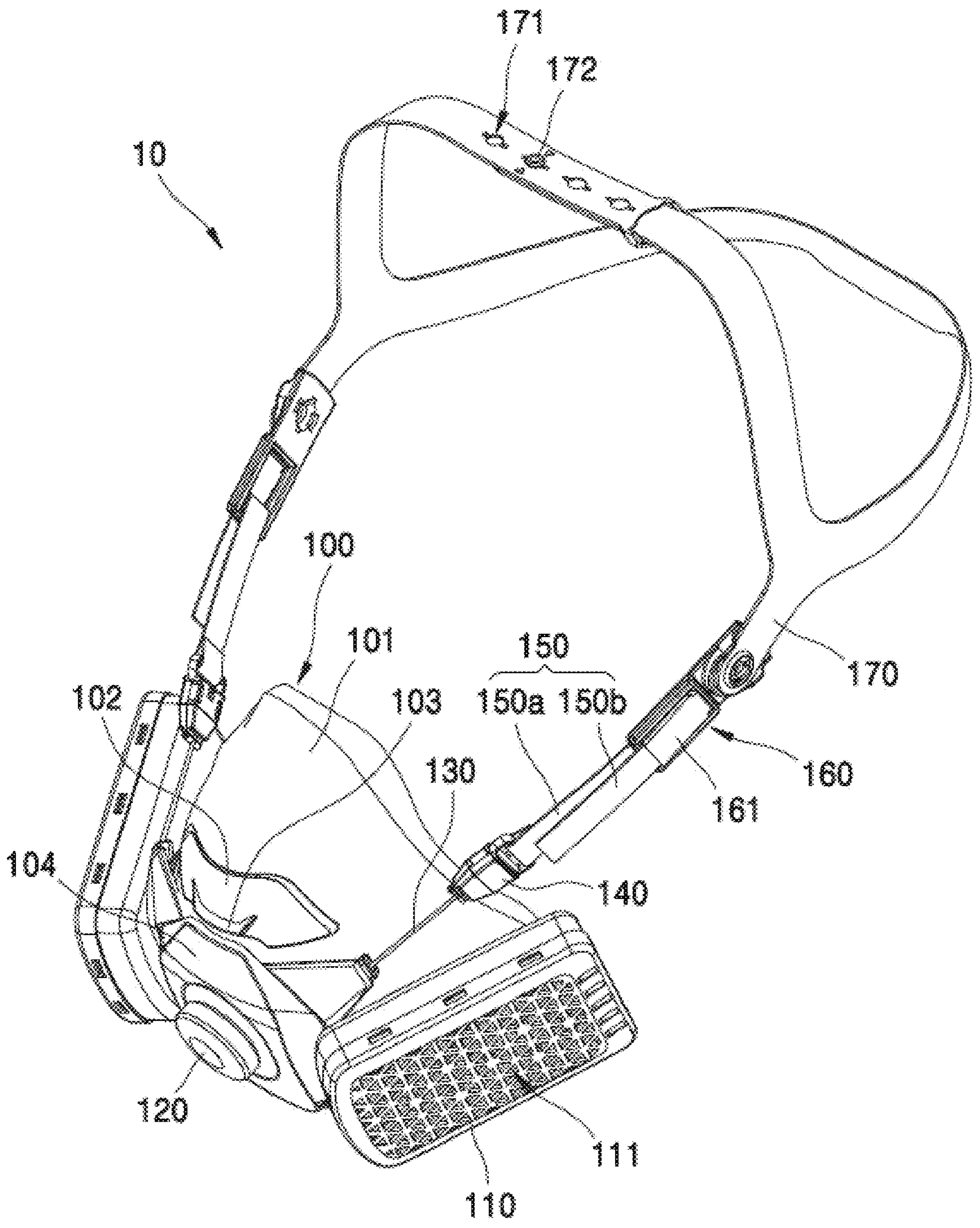
Figure 3:
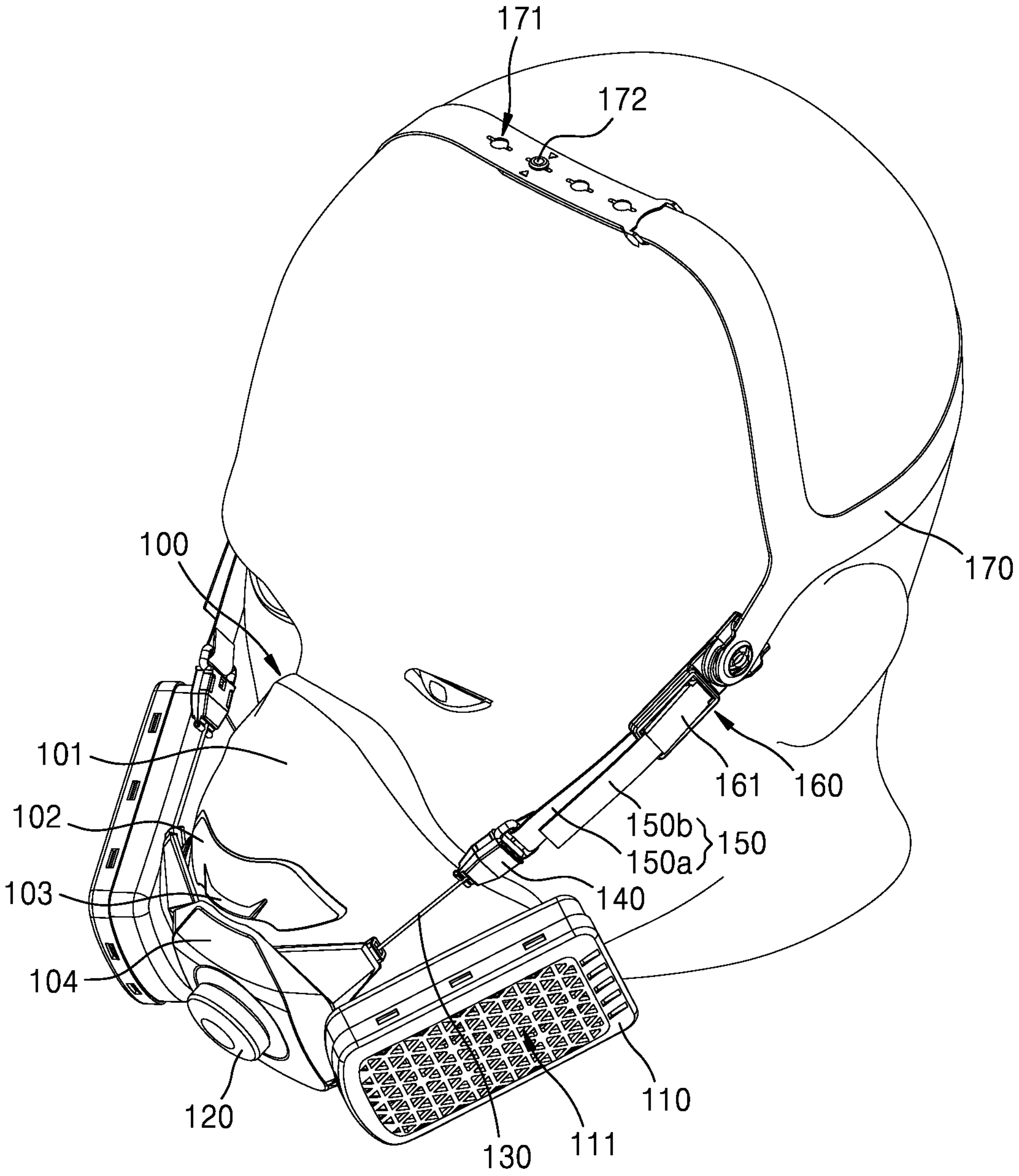
FIG. 3 is a perspective view showing a wearer who is wearing the mask of FIG. 2.

FIGS. 1 and 2 are a front view and a perspective view of a mask 10 according to an embodiment of the present disclosure, and FIG. 3 is a perspective view showing a wearer wearing the mask of FIG. 2.

Referring to FIGS. 1 to 3, a mask 10 may include a main body 100, a first dial 120, a first length member 130, a second length member 150, and a first length adjustment member 160. Also, the mask 10 may further include a first connection member 140 and a head band 170.

The main body 100 may be arranged on the face of the wearer. In one or more embodiments, the main body 100 may cover a lower part of the wearer's face, that is, nose and mouth.

The main body 100 may include a contact portion 101, a support portion 102, and a cover portion 104.

The contact portion 101 may come into contact with the face of the wearer. In one or more embodiments, the contact portion 101 may include a rubber material, and accordingly, the contact portion 101 is in close contact with the face of the wearer so as to prevent external harmful substances from entering the nose and the mouth of the wearer.

The support portion 102 is coupled to an inner surface of the contact portion 101 to cover the nose and the mouth of the wearer, and may be arranged to be spaced apart from the face of the wearer. In one or more embodiments, the support portion 102 may be formed of a plastic material or a metal material, and accordingly, may support a shape of the contact portion 101. That is, the support portion 102 may support the shape of the contact portion 101 so that the contact portion 101 may not block the nose and the mouth of the wearer and the wearer may sufficiently breathe. In one embodiment, a part of the support portion 102 may be exposed to outside through the contact portion 101. The support portion 102 may have a protrusion 103, and the wearer may finely adjust the position of the mask 10 by using the protrusion 103 while wearing the mask 10.

The cover portion 104 may be arranged on outer surfaces of the contact portion 101 and the support portion 102. The cover portion 104 supports the first dial 120 and may partially cover the first length member 130. In one or more embodiments, the cover portion 104 may include a plastic material or a metal material.

The filter 110 is arranged on a side portion of the main body 100 and may filter harmful substances in the air when the wearer inhales the air. In one or more embodiments, the filter 110 may be provided to be attachable to/detachable from a side portion of the support portion 102.

The filter 110 may include a suction port 111 in an outer surface thereof, and the wearer may inhale the air through the suction port 111. Interior members (not shown) are provided in the filter 110, and the harmful substances included in the air flowed into the filter 110 through the suction port 111 may be filtered by the interior members. Accordingly, the wearer may inhale the air filtered by the filter 110.

In addition, a discharge port 105 may be provided on the lower portion of the cover portion 104, and the wearer may exhale the air through the discharge port 105.

That is, the wearer may breathe by inhaling the air from which the harmful substances are filtered through the filter 110 and exhaling the air through the discharge port 105.

The first dial 120 may be provided on a center of the cover portion 104. One end of the first length member 130 may be connected to the first dial 120, and a length of the first length member 130 may be adjusted by the operation of the first dial 120. That is, when the wearer wears the mask, one end of the first length member 130 is wound on the first dial 120, and when the wearer releases the wearing state of the mask, one end of the first length member 130 may be unwound from the first dial 120 (see FIG. 4A), and accordingly, the length of the first length member 130 may be adjusted. The adjustment of the length of the first length member 130 through the operation of the first dial 120 will be described in detail later.

There may be two first length members 130, and each of the first length members 130 may be connected to the first dial 120 provided on the center of the cover portion 104 to be extended onto the side portion of the face of the wearer.

In addition, FIGS. 1 to 3 show that one first dial 120 is provided on the center of the cover portion 104 and two first length members 130 are respectively connected to the first dial 120, but one or more embodiments of the disclosure are not limited thereto. Two first dials 120 may be provided on the cover portion 104, and each of the first dials 120 may be provided on the side portion of the cover portion 104. In addition, the first length members 130 may be respectively connected to the adjacent first dials 120.

In one or more embodiment, a part of the first length member 130 is arranged on the contact portion 101 and may be covered by the cover portion 104. In an embodiment, the first length member 130 may include, for example, a wire. In an embodiment, the first length member 130 may not be in contact with the face of the wearer.

The other end of the first length member 130 may be connected to one side of the first connection member 140. The first connection member 140 may be arranged on the side portion of the face of the wearer.

The second length member 150 may be arranged in the lengthwise direction of the first length member 130. One end of the second length member 150 may be connected to the other side of the first connection member 140. That is, the first length member 130 is connected to one side of the first connection member 140 and the second length member 150 is connected to the other side of the first connection member 140, and thus, the first length member 130 and the second length member 150 may not be directly connected to each other. Accordingly, the length of the first length member 130 is adjusted by the operation of the first dial 120, but the length of the second length member 150 may not be adjusted. This will be described in detail later.

The second length member 150 may include a first part 150*a* that is adjacent to the face of the wearer and a second part 150*b* that is spaced apart from the face of the wearer.

In one embodiment, the second length member 150 may include, for example, a strap or a band. In one embodiment, the second length member 150 may be in contact with the face of the wearer.

The other end of the second length member 150 may be connected to one side of the first length adjustment member 160. The first length adjustment member 160 may be spaced apart from the main body 100 and may be arranged in the lengthwise direction of the first length member 130. In one embodiment, the first length adjustment member 160 may include, for example, a buckle, and a first lever 161 may be provided at one side of the first length adjustment member 160.

The length of the second length member 150 may be adjusted by the operation of the first length adjustment member 160. That is, the wearer may adjust the length of the second part 150*b* in the second length member 150 by operating the first length adjustment member 160, and then, may wear the mask 10 and release the worn state of the mask 10 (see FIG. 5A). The length adjustment of the second length member 150 according to the operation of the first length adjustment member 160 will be described in detail later.

The head band 170 may be connected to the other side of the first length adjustment member 160 and may surround the head portion of the wearer. In one or more embodiments, the head band 170 may surround the temporal region, the calvaria, and the occipital region.

In one or more embodiments, a part of the head band 170 surrounding the calvaria may include fastening holes 171 and a fastening protrusion 172. A plurality of fastening holes 171 may be provided, and the wearer may adjust the length of the head band 170 to be suitable for the size of the head of the wearer by fastening the fastening protrusion 172 with a desired fastening hole 171.

In one or more embodiments, the head band 170 may be formed of, for example, a cushion material, in order for the wearer to have a comfort in wearing.

Figure 4A:
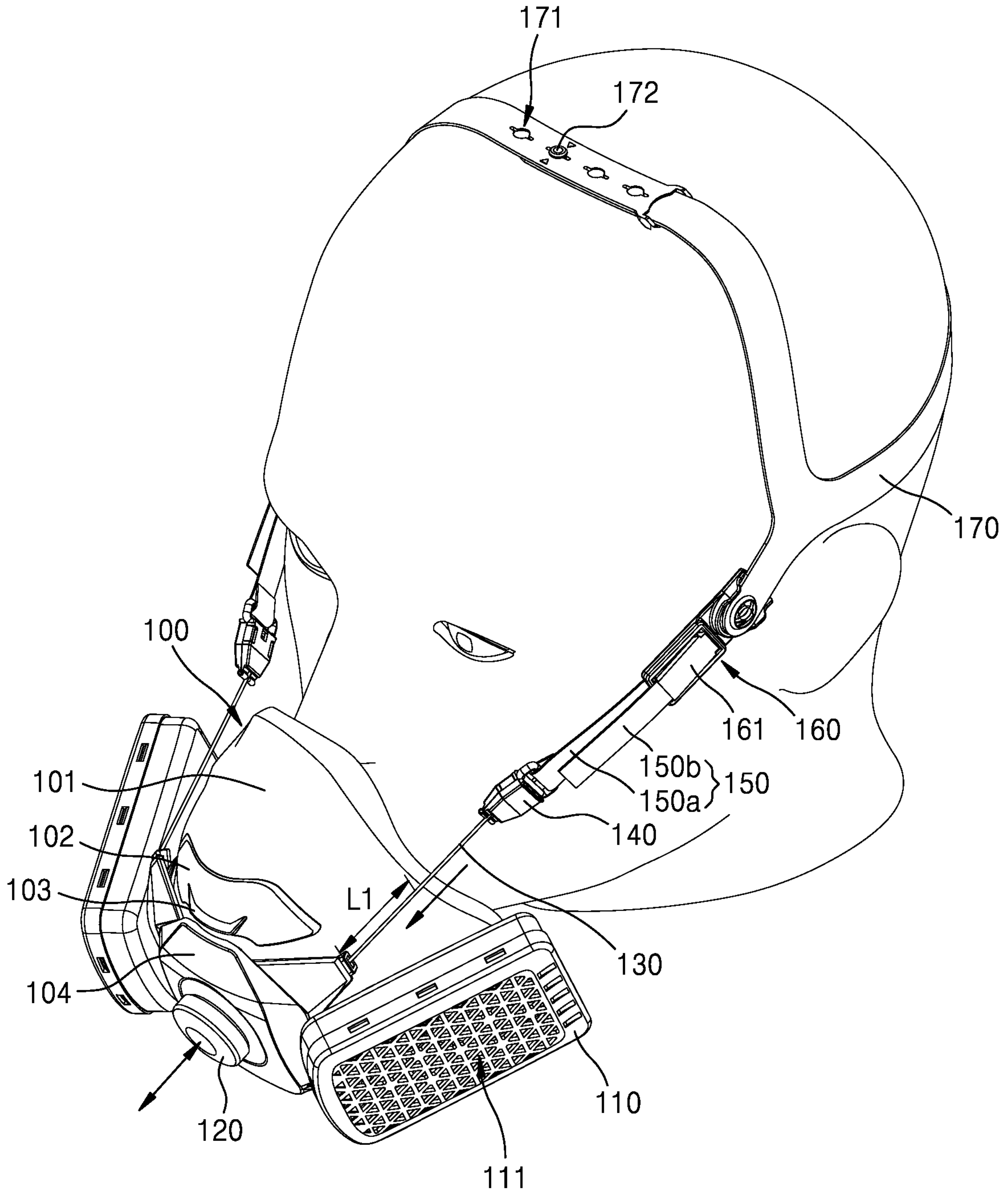
FIGS. 4A and 4B are perspective views showing a wearer is taking off the mask of FIG. 3 and is putting on the mask of FIG. 3.
Figure 4B:
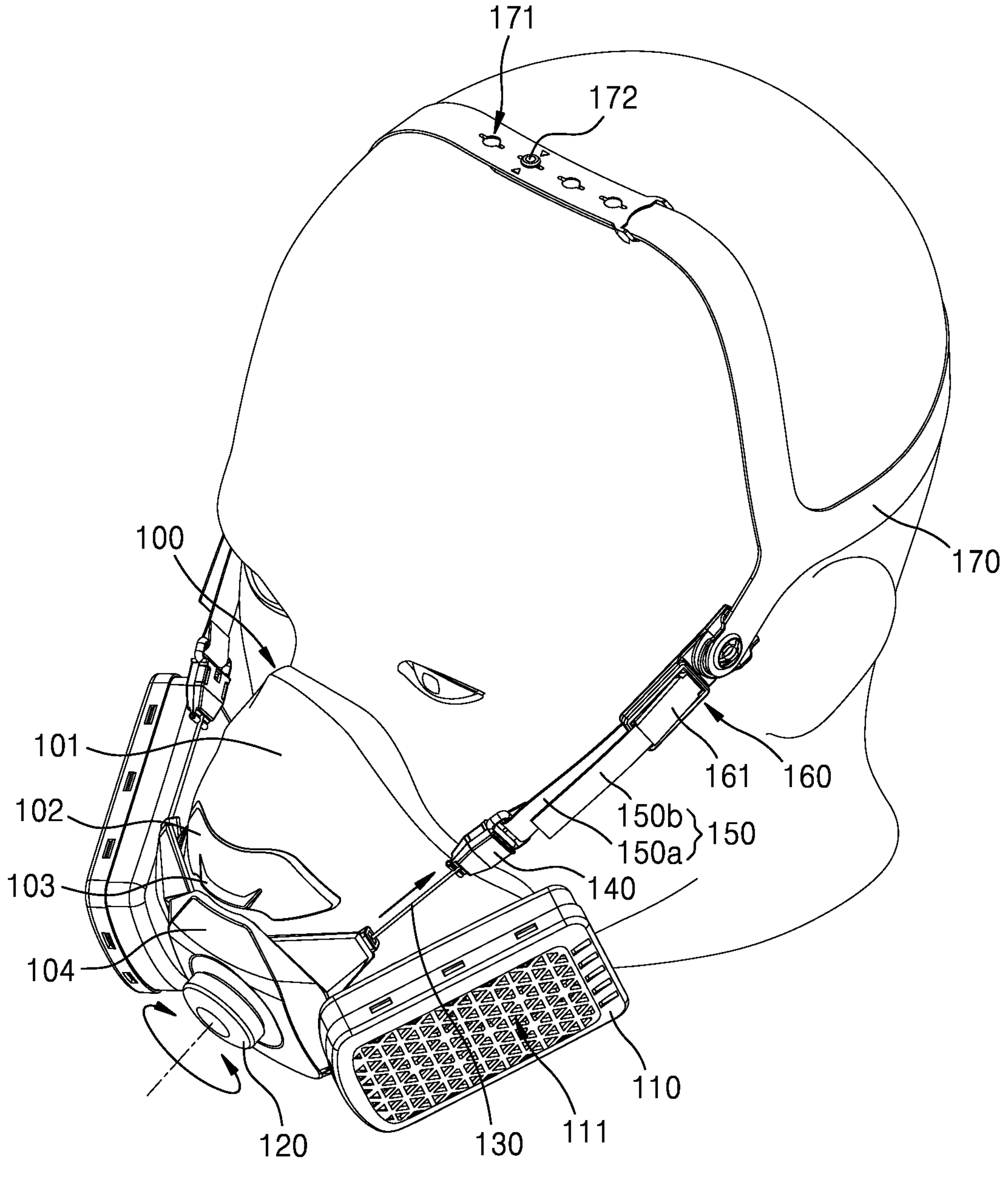

FIGS. 4A and 4B are perspective views showing a wearer is releasing the wearing of the mask of FIG. 3 and is wearing the mask of FIG. 3.

Referring to FIG. 4A, the wearer may release the wearing of the mask 10 by moving up or down the first dial 120. In detail, when the wearer moves up or down the first dial 120, one end of the first length member 130 wound on the first dial 120 may be unwound from the first dial 120, and accordingly, the first length member 130 may be stretched by a first length L1 to the maximum. That is, the wearer may release the wearing of the mask 10 by moving up or down the first dial 120 and increasing the length of the first length member 130.

In one or more embodiments, even when the first length member 130 is stretched by the first length L1, the mask 10 may not be completely separated from the face of the wearer, and accordingly, the mask 10 may not be taken off from the face of the wearer.

Referring to FIG. 4B, the wearer may wear the mask 10 by rotating the first dial 120. In detail, when the wearer rotates the first dial 120, one end of the first length member 130 may be wound on the first dial 120, and accordingly, the first length member 130 may be reduced by the first length L1 to the maximum. That is, the wearer may wear the mask 10 by rotating the first dial 120 and reducing the length of the first length member 130.

Figure 5A:
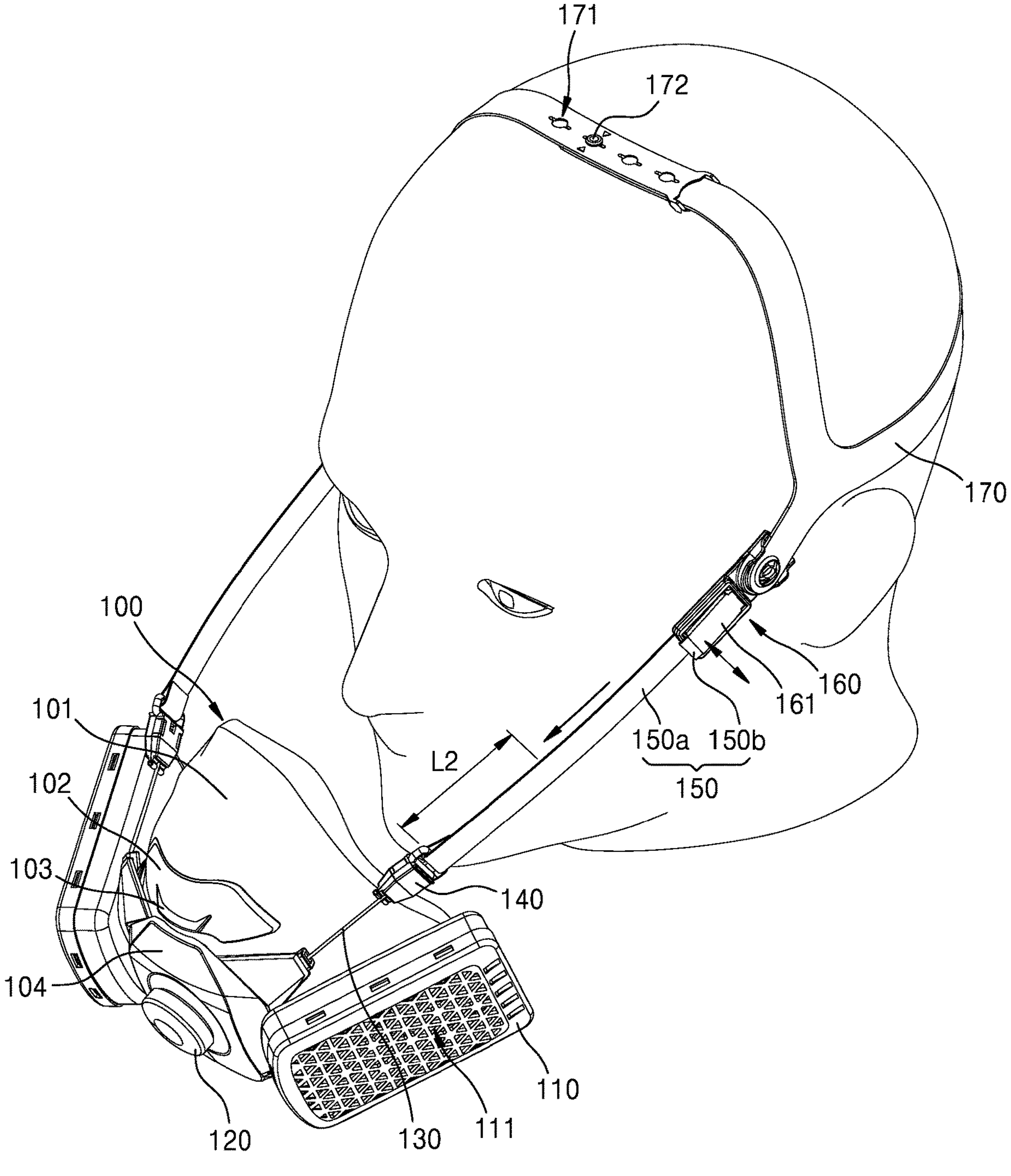
FIGS. 5A and 5B are perspective views showing a wearer is taking off the mask of FIG. 3 and is putting on the mask of FIG. 3.

Referring to FIG. 5A, the wearer may release the wearing of the mask 10 by opening the first lever 161 of the first length adjustment member 160 and pulling the first part 150*a* of the second length member 150 in a first direction in which the main body 100 is away from the face of the wearer.

Here, the first part 150*a* may be stretched by a second length L2 to the maximum, and the second part 150*b* may be reduced by the second length L2 to the maximum. In one or more embodiments, the second length L2 may be greater than the first length L1.

In one or more embodiments, when the first part 150*a* is increased by the second length L2, the mask 10 may be completely isolated from the face of the wearer, and accordingly, the mask 10 may be completely taken off from the face of the wearer.

Figure 5B:
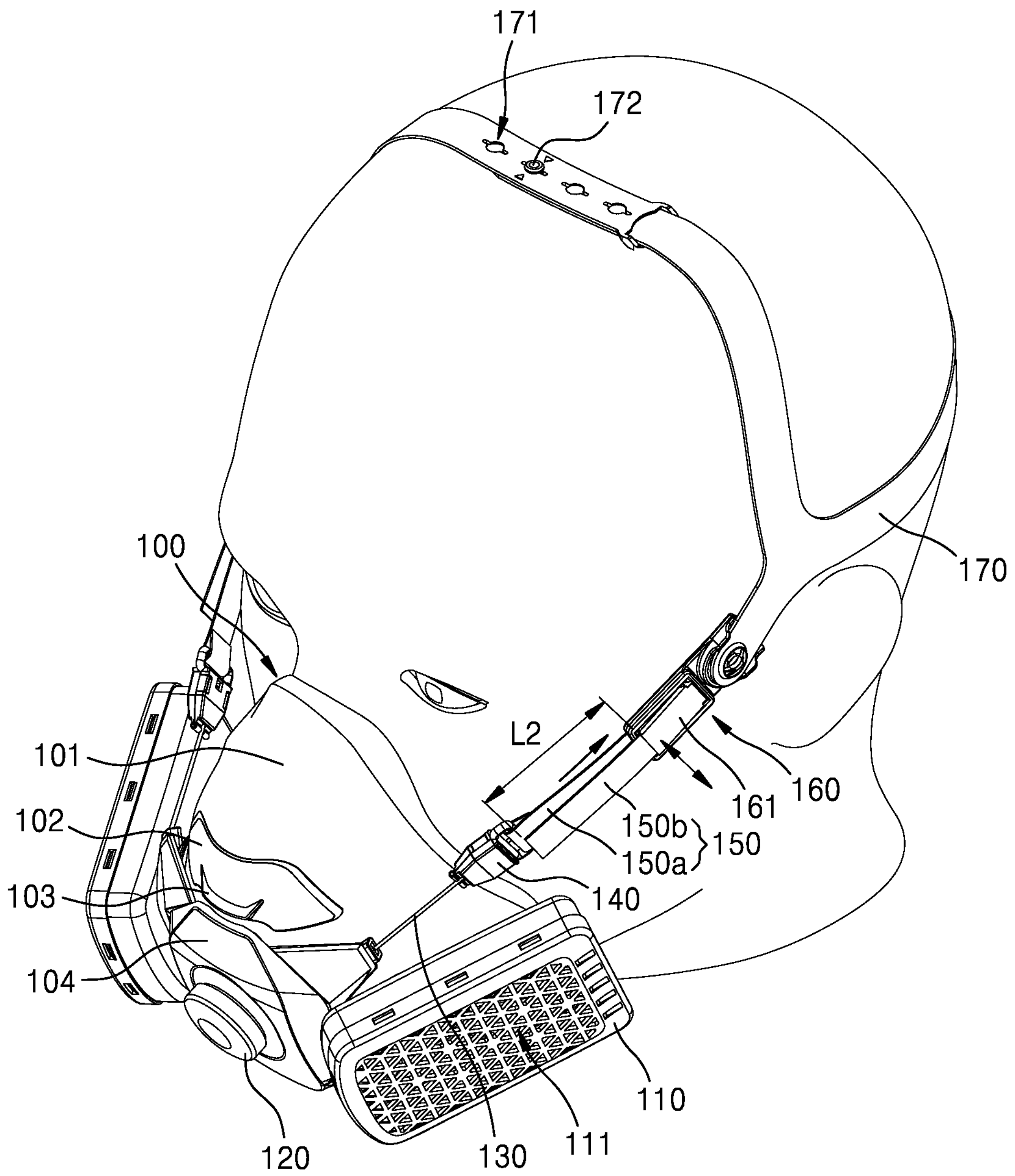

Referring to FIG. 5B, the wearer may wear the mask 10 by opening the first lever 161 of the first length adjustment member 160 and then pulling the second part 150*b* of the second length member 150 in the first direction. Here, the first part 150*a* may be reduced by the second length L2 to the maximum, and the second part 150*b* may be increased by the second length L2 to the maximum.

The wearer may close the first lever 161 after adjusting the length of the second length member 150, in order to prevent the second length member 150 from being isolated from the first length adjustment member 160 or the length of the first length adjustment member 160 from being changed, and accordingly, the second length member 150 may be fixed by the first length adjustment member 160.

In addition, FIGS. 4A and 5B show that the wearer wears the mask 10 or releases the wearing of the mask 10 by separately operating the first dial 120 and the first length adjustment member 160 and descriptions are provided based on FIGS. 4A and 5B. However, the present disclosure is not limited thereto, that is, the wearer may wear the mask 10 or releases the wearing of the mask 10 by simultaneously operating the first dial 120 and the first length adjustment member 160.

As described above, the wearer may wear the mask 10 or releases the wearing of the mask 10 by operating the first dial 120 and adjusting the first length member 130. Here, the first length member 130 may be adjusted by the first length L1 by the operation of the first dial 120, and even when the first dial 120 is increased by the first length L1, the mask 10 may not be taken off from the face of the wearer. That is, the wearer may release the wearing of the mask 10 without completely taking off the mask 10 from the face of the wearer by operating the first dial 120 and adjusting the length of the first length member 130.

The wearer may feel a necessity for temporarily releasing the wearing of the mask 10 without completely taking off the mask 10, for short-term break such as sufficient breath, conversation, phone call, and drinking without taking off the mask 10. Here, the wearer may release the wearing of the mask 10 by moving up or down the first dial 120, and take a short-term break. Then, the wearer may re-wear the mask 10 by rotating the first dial 120. In addition, it is simple and easy for the wearer to operate the first dial 120, and thus, the wearer may release the wearing of the mask 10 and re-wear the mask 10 rapidly and effectively. Accordingly, the wearer may reduce the time taken to release the wearing of the mask 10 or re-wear the mask, and thus, the time period for the wearer to be exposed to the harmful substances may be reduced as much as possible.

Also, the wearer may wear the mask 10 or release the wearing of the mask 10 by operating the first length adjustment member 160 and adjusting the second length member 150. Here, the first part 150*a* of the second length member 150 may be adjusted by the second length L2 according to the operation of the first length adjustment member 160. The second length L2 may be greater than the first length L1, and when the second part 150*b* is stretched by the second length L2, the mask 10 may be completely taken off from the face of the wearer. That is, the wearer may take off the mask 10 by operating the first length adjustment member 160 and adjusting the length of the first part 150*a*.

Also, the first length member 130 is connected to one side of the first connection member 140 and the second length member 150 is connected to the other side of the first connection member 140, and thus, the length adjusting action of the first length member 130 according to the operation of the first dial 120 and the length adjusting action of the second length member 150 according to the first length adjustment member 160 may be independently carried out from each other. In other words, when the wearer adjusts the length of the first length member 130 by operating the first dial 120, the length of the second length member 150 may not be adjusted, and when the wearer adjusts the length of the second length member 150 by operating the first length adjustment member 160, the length of the first length member 130 may not be adjusted.

That is, the mask 10 includes the first dial 120 and the first length adjustment member 160, operations of which do not affect each other. Accordingly, the wearer may take a short-term break by releasing the wearing state of the mask 10 through the operation of the first dial 120, and may completely take off the mask 10 from the face by operating the first length adjustment member 160. That is, the wearer may selectively operate the first dial 120 or the first length adjustment member 160 in order to perform the desired action, and the convenience of the mask 10 may be improved.

Figure 6:
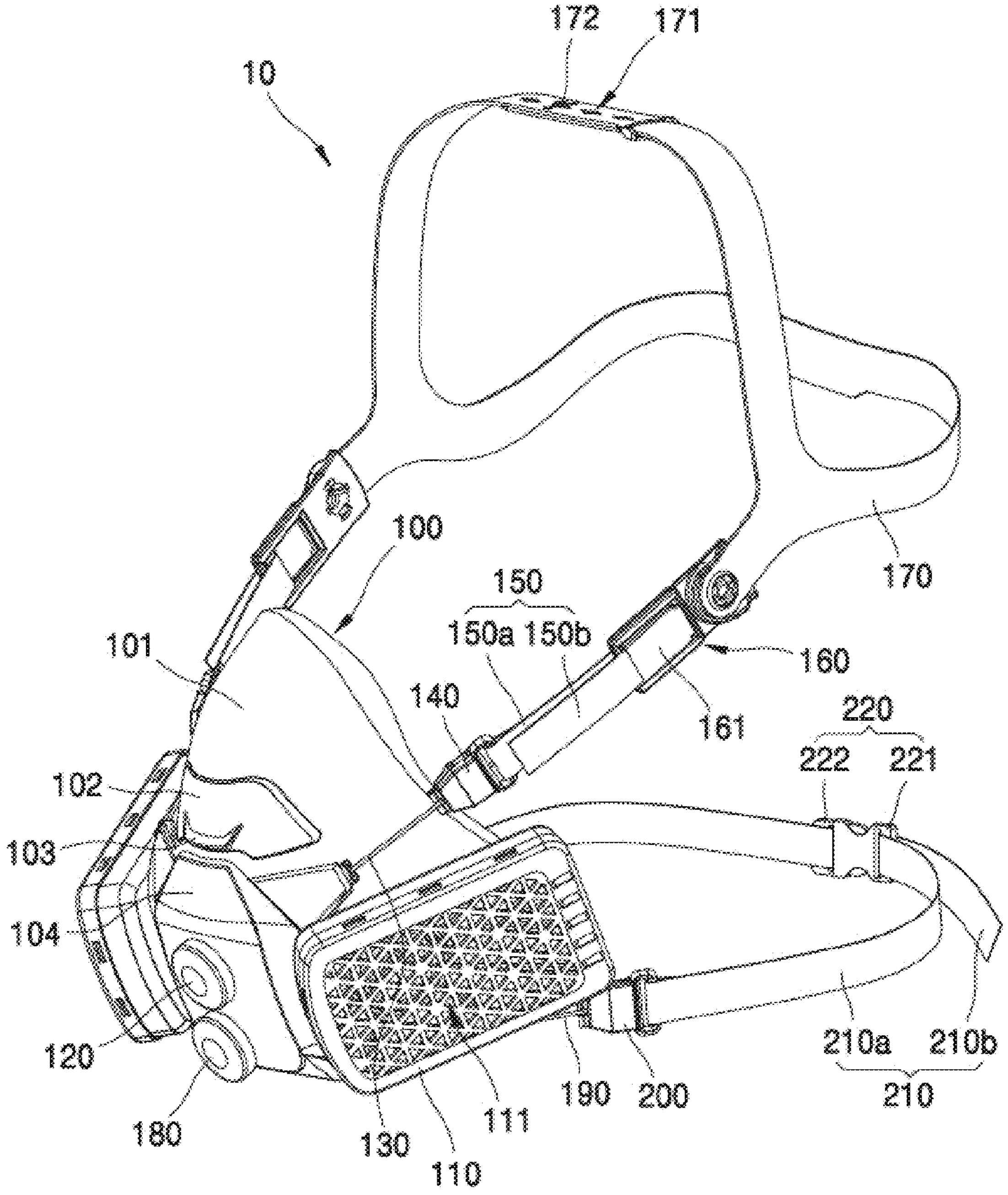
FIG. 6 is a perspective view of a mask according to an embodiment of the present disclosure.

FIG. 6 is a perspective view of the mask 10 according to an embodiment of the present disclosure. The mask includes elements that are substantially the same as or similar to the elements described above with reference to FIGS. 1 to 5B, and thus, redundant descriptions are omitted.

Referring to FIG. 6, the mask 10 may include the main body 100, the first dial 120, a second dial 180, the first length member 130, the second length member 150, a third length member 190, a fourth length member 210, the first length adjustment member 160, and a second length adjustment member 220. Also, the mask 10 may further include the first connection member 140, a second connection member 200, and the head band 170.

The first dial 120 may be provided on an upper central portion of the cover portion 104.

The second dial 180 may be provided on a lower central portion of the cover portion 104. In one or more embodiments, the second dial 180 may be arranged on the chin of the wearer to be adjacent to the first dial 120.

One end of the third length member 190 may be connected to the second dial 180, and a length of the third length member 190 may be adjusted according to the operation of the second dial 180. That is, when the wearer wears the mask, one end of the third length member 190 is wound on the second dial 180, and when the wearer releases the wearing of the mask, one end of the third length member 190 may be unwound from the second dial 180, and accordingly, the length of the third length member 190 may be adjusted.

In addition, the operation of the second dial 180 and the length adjusting action of the third length member 190 thereby may be substantially the same as the operation of the first dial 120 and the length adjusting action of the first length member 130 thereby. The length of the third length member 190 may be adjusted by a third length according to the operation of the second dial 180. In one or more embodiments, the third length may be substantially the same as the first length L1 and may be less than the second length L2.

In one or more embodiments, even when the third length member 190 is increased by the third length, the mask 10 may not be completely separated from the face of the wearer, and accordingly, the mask 10 may not be taken off from the face of the wearer.

There may be two third length members 190, and each of the third length members 190 may be connected to the second dial 180 provided on the lower central portion of the cover portion 104 and may be extended onto the chin of the wearer.

In one or more embodiment, a part of the third length member 190 is arranged on the contact portion 101 and may be covered by the cover portion 104. In an embodiment, the third length member 190 may include, for example, a wire. In an embodiment, the third length member 190 may not be in contact with the face of the wearer.

The other end of the third length member 190 may be connected to one side of the second connection member 200. The second connection member 200 may be located on the neck of the wearer.

The third length member 190 may be arranged in the lengthwise direction of the third length member 190. One end of the fourth length member 210 may be connected to the other side of the second connection member 200. That is, the third length member 190 is connected to one side of the second connection member 200, and the fourth length member 210 is connected to the other side of the second connection member 200. Thus, the third length member 190 and the fourth length member 210 may not be directly connected to each other. Accordingly, the length adjusting action of the third length member 190 through the operation of the second dial 180 and the length adjusting action of the fourth length member 210 by the second length adjustment member 220 may be carried out independently from each other.

The fourth length member 210 may include a third part 210*a* adjacent to the neck of the wearer and a fourth part 210*b* spaced apart from the neck of the wearer.

In one embodiment, the fourth length member 210 may include, for example, a strap or a band. In an embodiment, the fourth length member 210 may be in contact with the neck of the wearer.

The other end of the fourth length member 210 may be connected to the second length adjustment member 220. In an embodiment, the second length adjustment member 220 may include, for example, female/male buckles, and accordingly, may include a first female buckle 221 and a first male buckle 222. Also, the first female buckle 221 may have a second lever (not shown).

The length of the fourth length member 210 may be adjusted by the operation of the second length adjustment member 220. That is, the wearer may wear the mask 10 and release the wearing of the mask 10 by operating the second length adjustment member 220 and adjusting the length of the third part 210*a* of the fourth length member 210.

In addition, the operation of the second length adjustment member 220 and the length adjusting action of the fourth length member 210 thereby may be substantially the same as the operation of the first length adjustment member 160 and the action of the second length member 150 thereby. The fourth length member 210 may be adjusted by a fourth length by the operation of the second length adjustment member 220. In one or more embodiments, the fourth length may be substantially the same as the second length L2 and may be greater than the first length L1 and the third length.

In one or more embodiments, when the first part 150*a* of the second length member 150 is increased by the second length L2 and the third part 210*a* of the fourth length member 210 is increased by the third length, the mask 10 may be completely taken off from the face of the wearer.

FIG. 6 shows that a portion of the fourth length member 210, which is connected to the first female buckle 221, only includes the fourth part 210*b*, but the present disclosure is not limited thereto. That is, a portion of the fourth length member 210, which is connected to the first male buckle 222, may only include the fourth part 210*b* or the portion of the fourth length member 210 connected to the first female buckle 221 and the portion of the fourth length member 210 connected to the first male buckle 222 may respectively include the fourth parts 210*b*.

Also, it is described that the first female buckle 221 only has the second lever, but the present disclosure is not limited thereto. That is, the first male buckle 222 may only has the second lever, or the first female buckle 221 and the first male buckle 222 may respectively have the second levers.

As described above, the moving-up/down actions or the rotating action of the first dial 120 or the second dial 180 are straightforward and easy for the wearer, and thus, the wearer may rapidly and effectively release the wearing of the mask 10 and re-wear the mask 10. Accordingly, the wearer may reduce the time taken to release the wearing of the mask 10 or re-wear the mask, and thus, the time period for the wearer to be exposed to the harmful substances may be reduced as much as possible.

Also, the second dial 180, the third length member 190, the fourth length member 210, and the second length adjustment member 220 are arranged on the chin and the neck of the wearer so that the adhesion between the face of the wearer and the mask 10 may be further improved. Accordingly, the mask 10 may have an improved performance of blocking harmful substances.

Figure 7:
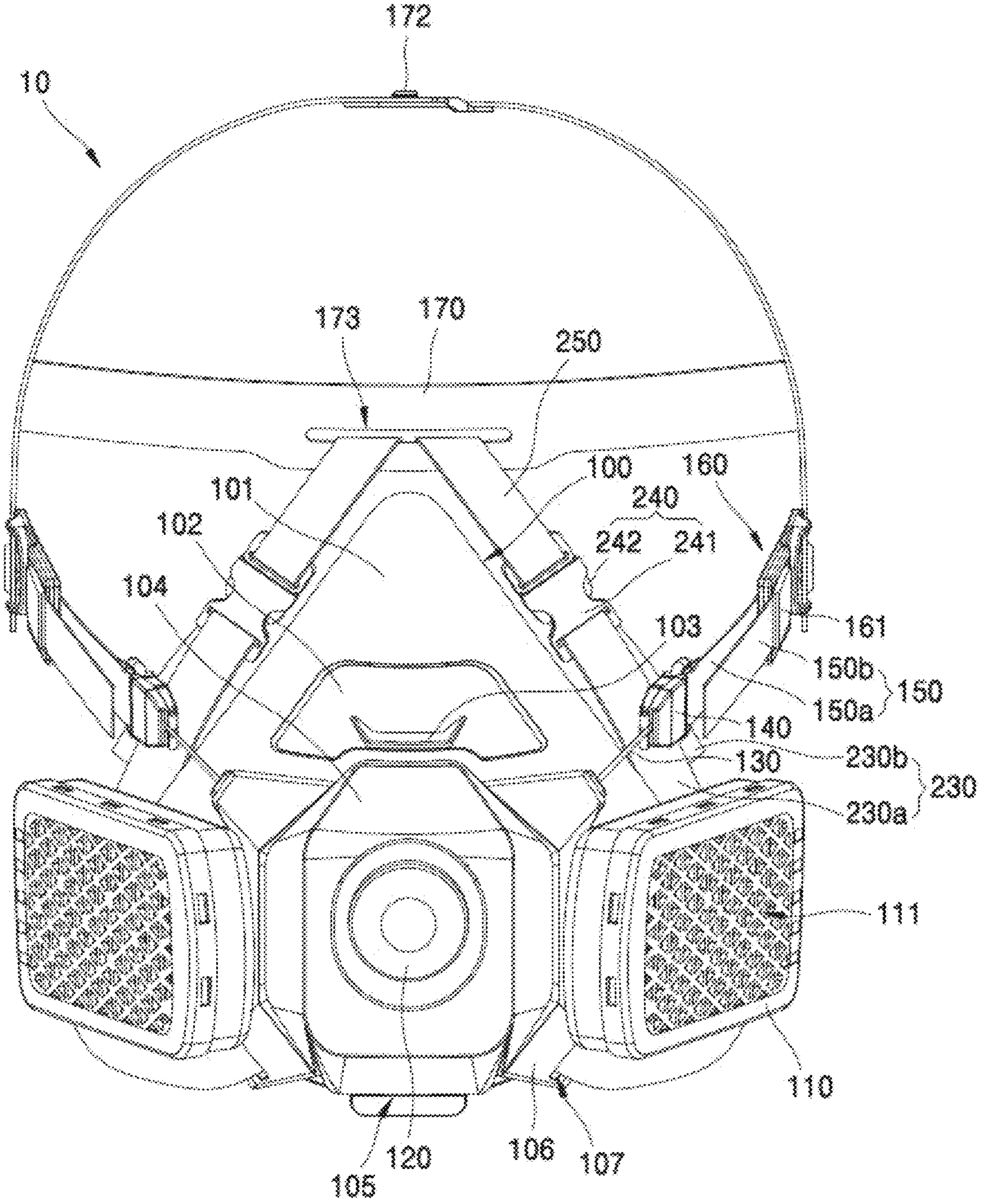
FIGS. 7 and 8 are a front view and a perspective view of a mask according to an embodiment of the present disclosure.
Figure 8:
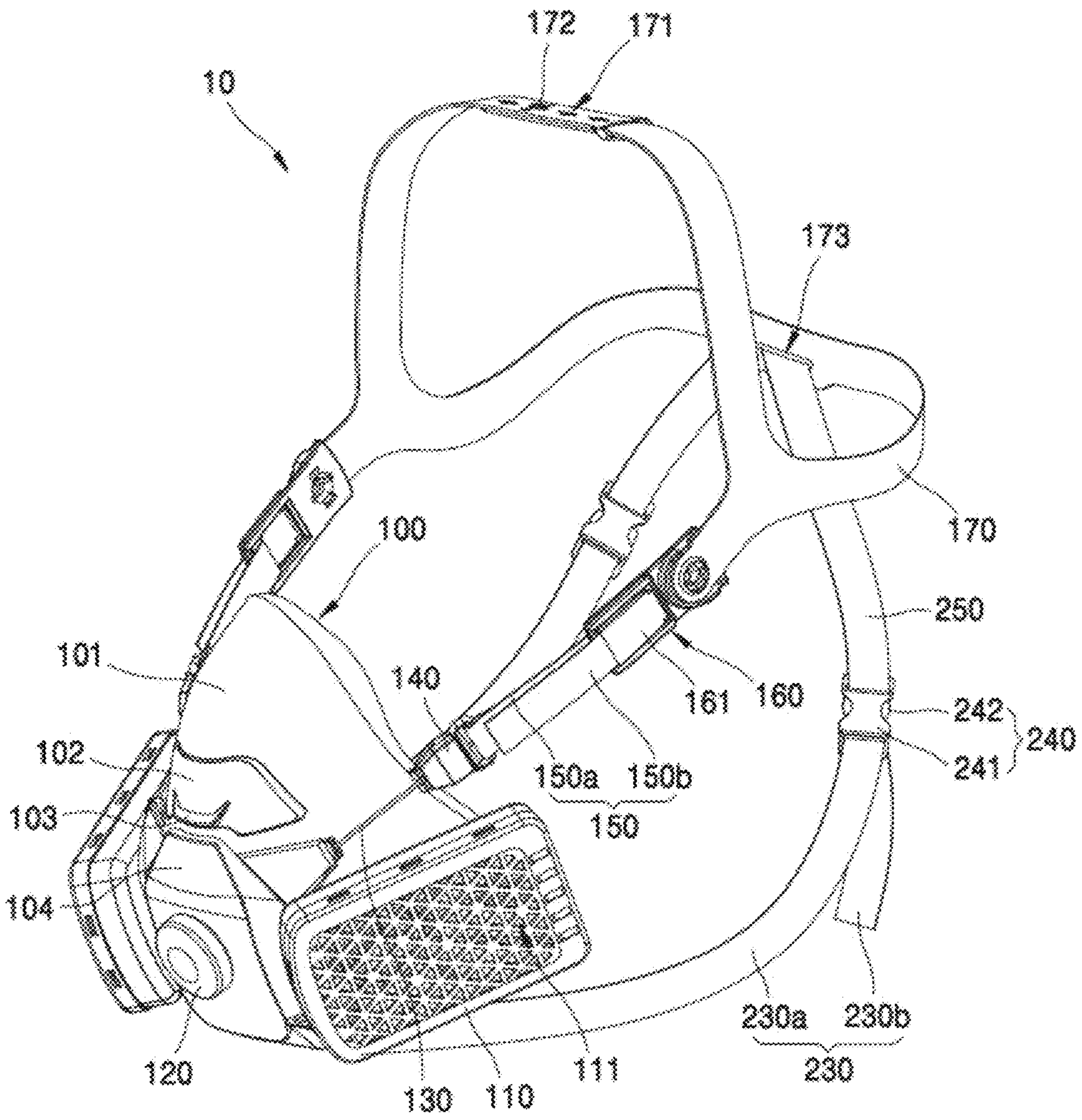

FIGS. 7 and 8 are a perspective view of the mask 10 according to an embodiment of the present disclosure. The mask includes elements that are substantially the same as or similar to the elements described above with reference to FIGS. 1 to 5B, and thus, redundant descriptions are omitted.

Referring to FIGS. 7 and 8, the mask 10 may include the main body 100, the first dial 120, the first length member 130, the second length member 150, a fifth length member 230, a sixth length member 250, the first length adjustment member 160, and a third length adjustment member 240. Also, the mask 10 may further include the first connection member 140 and the head band 170.

A connecting end 106 may be provided on a lower side portion of the cover portion 104 in the main body 100, and the connecting end 106 may include a first connection groove 107.

One end of the fifth length member 230 may be connected to the first connection groove 107.

The fifth length member 230 may include a fifth part 230*a* that is adjacent to the chin or neck of the wearer and a sixth part 230*b* spaced apart from the chin or neck of the wearer.

In one embodiment, the fifth length member 230 may include, for example, a strap or a band. In an embodiment, the fifth length member 230 may be in contact with the chin or neck of the wearer.

The other end of the fifth length member 230 may be connected to one side of the third length adjustment member 240. In an embodiment, the third length adjustment member 240 may include, for example, female/male buckles, and accordingly, may include a second female buckle 241 and a second male buckle 242. Also, the second female buckle 241 may have a third lever (not shown).

A length of the fifth length member 230 may be adjusted by the operation of the third length adjustment member 240. That is, the wearer may wear the mask 10 and release the wearing of the mask 10 by operating the third length adjustment member 240 and adjusting the length of the fifth part 230*a* of the fifth length member 230.

In addition, the operation of the third length adjustment member 240 and the length adjusting action of the fifth length member 230 thereby may be substantially the same as the operation of the first length adjustment member 160 and the action of the second length member 150 thereby. The fifth length member 230 may be adjusted by a fifth length according to the operation of the third length adjustment member 240. In one or more embodiments, the fifth length may be substantially the same as the second length L2 and may be greater than the first length L1.

In one or more embodiments, when the first part 150*a* of the second length member 150 is increased by the second length L2 and the fifth part 230*a* of the fifth length member 230 is increased by the fifth length, the mask 10 may be completely taken off from the face of the wearer.

One end of the sixth length member 250 may be connected to the other side of the third length adjustment member 240.

In one embodiment, the sixth length member 250 may include, for example, a strap or a band.

The head band 170 may be provided with a second connection groove 173 in a portion surrounding the back of the head. The other end of the sixth length member 250 may be connected to the second connection groove 173.

In an embodiment, the sixth length member 250 may be in contact with the neck or the back of the head of the wearer.

The fifth length member 230, the third length adjustment member 240, and the sixth length member 250 are arranged on the chin, the neck, and the back of the head of the wearer, and thus, the adhesion between the face of the wearer and the mask 10 may be further improved. Accordingly, the mask 10 may have an improved shielding property with respect to the harmful substances.

Figure 9:
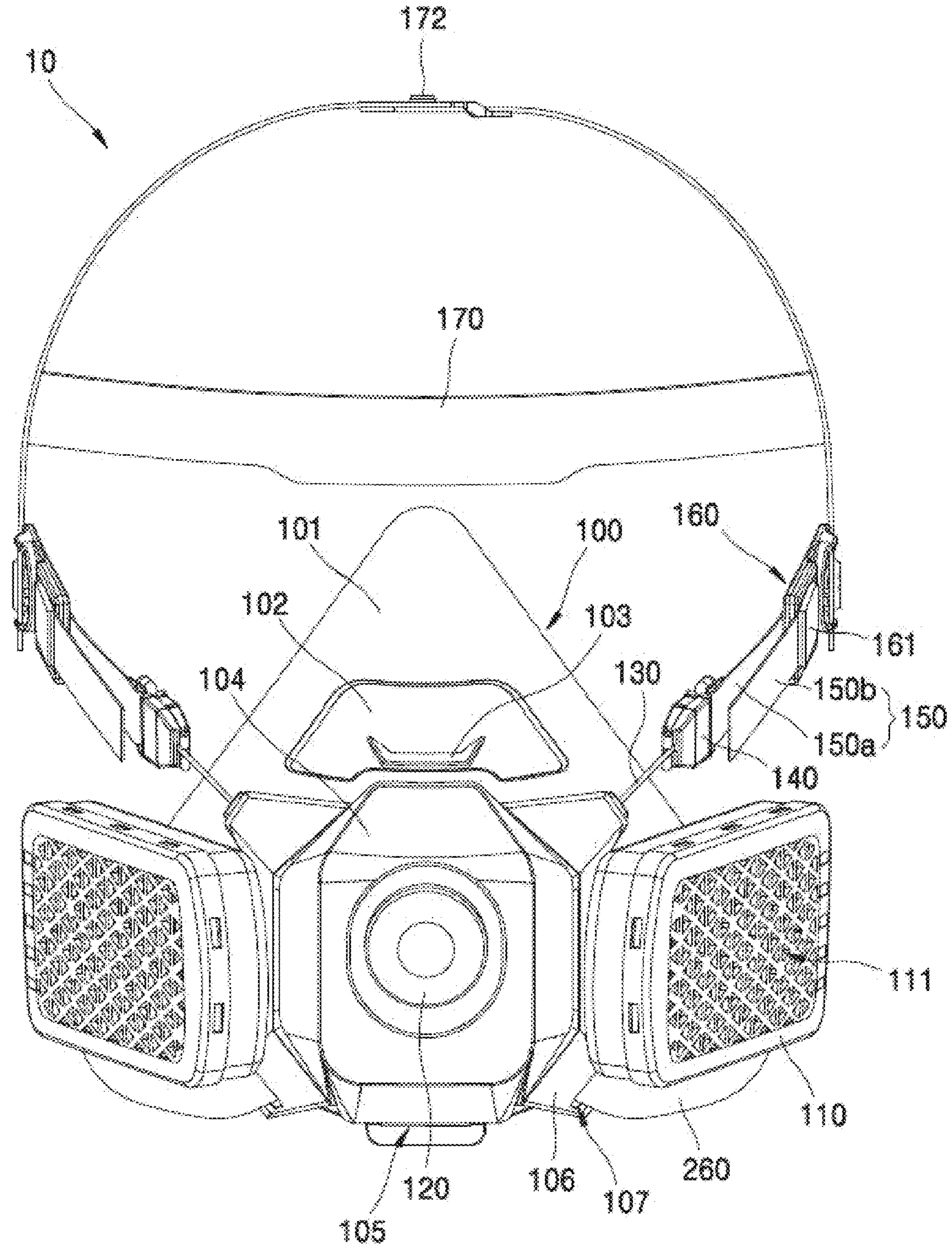
FIGS. 9 and 10 are a front view and a perspective view of a mask according to an embodiment of the present disclosure.
Figure 10:
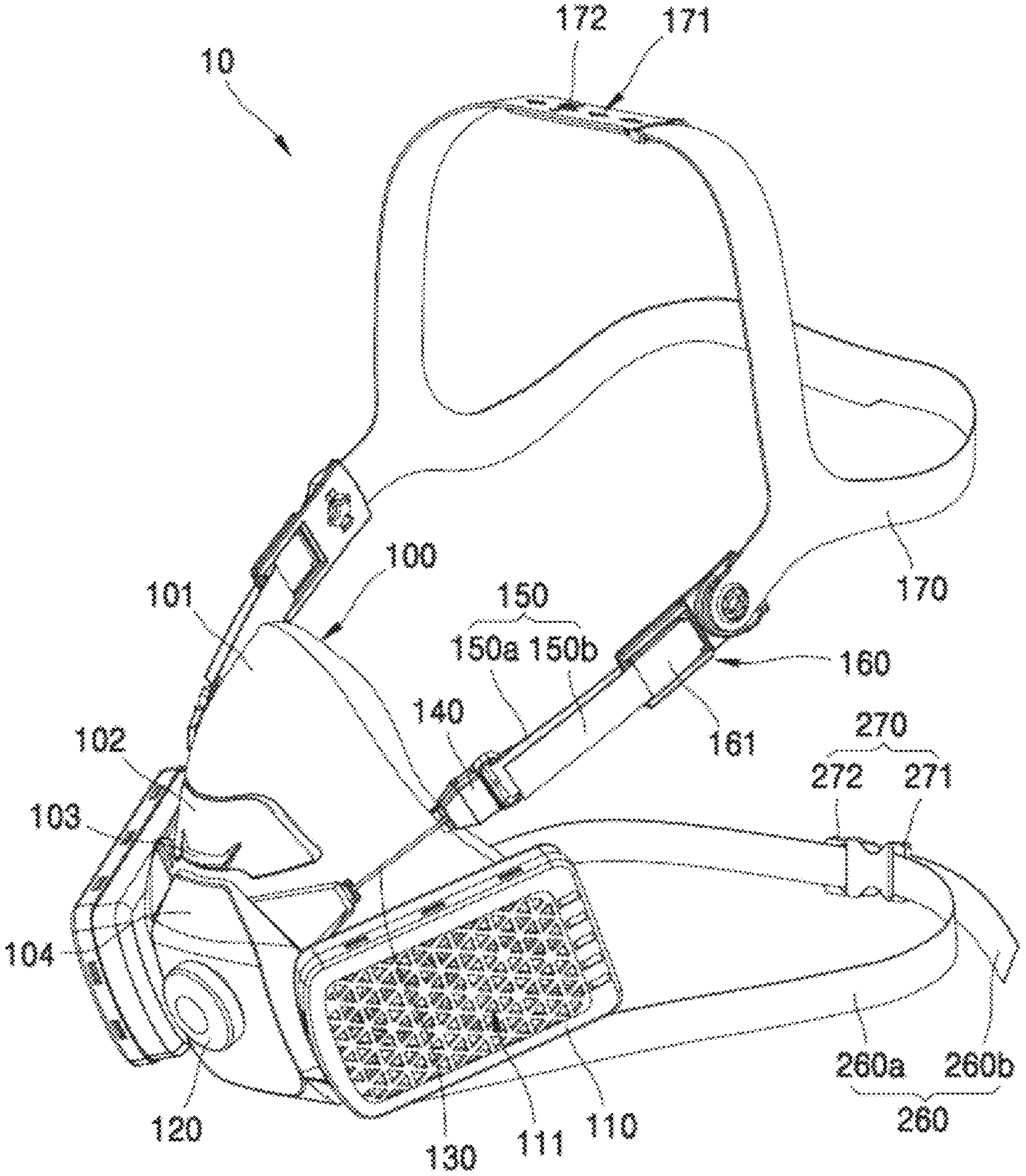

FIGS. 9 and 10 are a perspective view of the mask 10 according to an embodiment of the present disclosure. The mask includes elements that are substantially the same as or similar to the elements described above with reference to FIGS. 1 to 5B, and thus, redundant descriptions are omitted.

The connecting end 106 may be provided on the lower side portion of the cover portion 104 in the main body 100, and the connecting end 106 may include the first connection groove 107.

One end of the seventh length member 260 may be connected to the first connection groove 107.

The seventh length member 260 may include a seventh part 260*a* that is adjacent to the chin or neck of the wearer and an eighth part 260*b* spaced apart from the chin or neck of the wearer.

In an embodiment, the seventh length member 260 may include, for example, a strap or a band. In an embodiment, the seventh length member 260 may be in contact with the chin or neck of the wearer.

The other end of the seventh length member 260 may be connected to the fourth length adjustment member 270. In an embodiment, the fourth length adjustment member 270 may include, for example, female/male buckles, and accordingly, may include a third female buckle 271 and a third male buckle 272. Also, the third female buckle 271 may have a fourth lever (not shown).

A length of the seventh length member 260 may be adjusted by the operation of the fourth length adjustment member 270. That is, the wearer may wear the mask 10 and release the wearing of the mask 10 by operating the fourth length adjustment member 270 and adjusting the length of the seventh part 260*a* of the seventh length member 260.

In addition, the operation of the fourth length adjustment member 270 and the length adjusting action of the seventh length member 260 thereby may be substantially the same as the operation of the first length adjustment member 160 and the action of the second length member 150 thereby. The seventh length member 260 may be adjusted by a sixth length according to the operation of the fourth length adjustment member 270. In one or more embodiments, the sixth length may be substantially the same as the second length L2 and may be greater than the first length L1.

In one or more embodiments, when the first part 150*a* of the second length member 150 is increased by the second length L2 and the seventh part 260*a* of the seventh length member 260 is increased by the sixth length, the mask 10 may be completely taken off from the face of the wearer.

FIGS. 9 and 10 show that a portion of the seventh length member 260 connected to the third female buckle 271 only includes the eighth part 260*b*, but the present disclosure is not limited thereto. That is, the portion of the seventh length member 260 connected to the third male buckle 272 may only include the eighth part 260*b*, or the portion of the seventh length member 260 connected to the third female buckle 271 and the portion of the seventh length member 260 connected to the third male buckle 272 may respectively have the eighth parts 260*b*.

Also, it is shown that the third female buckle 271 only includes the fourth lever, but the present disclosure is not limited thereto. That is, the third male buckle 272 may only include the fourth lever, or the third female buckle 271 and the third male buckle 272 may respectively include the fourth levers.

The seventh length member 260 and the fourth length adjustment member 270 may be arranged on the chin and the neck of the wearer, and thus, the adhesion between the face of the wearer and the mask 10 may be further improved. Accordingly, the mask 10 may have an improved shielding property of the harmful substances.

While the preferred embodiments of the present disclosure have been described in detail, it will be apparent to those skilled in the art that various modifications can be made to the above-described exemplary embodiments of the present disclosure without departing from the scope of the present disclosure.

In the mask according to one or more embodiments of the present disclosure, the wearer may temporarily release the wearing of the mask without completely taking off the mask by operating the dial provided on the main body and adjusting the length of the first length member, and then may have a short-term break. Here, it is simple and easy for the wearer to operate the dial, and thus, the wearer may release the wearing of the mask and re-wear the mask rapidly and effectively. Accordingly, the wearer may reduce the time taken to release the wearing state of the mask or re-wear the mask, and thus, the time period for the wearer to be exposed to the harmful substances may be reduced as much as possible.

Also, the mask may include the length adjustment member for adjusting the length of the second length member, and the wearer may completely take off the mask by operating the length adjustment member and adjusting the length of the second length member.

Meanwhile, the operation of the dial and the operation of the length adjustment member may not affect each other. Accordingly, the wearer may have a short-term break by operating the dial and releasing the wearing state of the mask, and may completely take off the mask from the face by operating the length adjustment member. That is, the wearer may selectively operate the dial or the length adjustment member in order to carry out the desired operation, and the convenience of the mask may be improved.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A mask comprising:

a main body configured to be arranged on a face of a wearer and to cover a nose and a mouth of the wearer;

a first length member connected to the main body and spaced apart from the headband, and formed of a wire;

a second length member connected to the headband and spaced apart from the main body and arranged in a lengthwise direction of the first length member, and formed of a strip or a band;

a connection member having one side connected to the first length member and another side connected to the second length member;

a first dial provided on the main body and connected to the first length member;

a length adjustment member arranged in the lengthwise direction of the first length member and connected to the second length member; and a headband connected to the length adjustment member and configured to surround a posterior portion of a head of the wearer, wherein the length adjustment member is located between the headband and the second length member, wherein an operation of the first dial adjusts a length of the first length member so that the main body is detachably separated from the face of the wearer;

wherein an operation of the length adjustment member adjusts a length of the second length member so that the mask including the main body and the headband is completely removable from the wearer; and wherein the adjustment operation of the first length member and the adjustment operation of the second length member are performed independently of each other.

2. The mask of claim 1, wherein the length of the first length member adjusted by the operation of the first dial is less than the length of the second length member adjusted by the operation of the length adjustment member.

3. The mask of claim 1, wherein when the wearer wears the mask, the first length member is arranged on the main body and is not in contact with the face of the wearer.

4. The mask of claim 1, wherein the first dial is provided on a center portion of the main body, and the connection member configured to be arranged on a side portion of the face of the wearer.

5. The mask of claim 1, wherein the length adjustment member includes a buckle.

6. The mask of claim 1, further comprising:

a second dial provided on the main body and configured to be arranged on the chin of the wearer to be adjacent to the first dial; and a third length member connected to the second dial, wherein a length of the third length member is adjusted by an operation of the second dial.

7. The mask of claim 1, wherein the second length member is connected to one side of the length adjustment member.

8. The mask of claim 7, further comprising a fourth length member connected to the main body and the headband.

9. The mask of claim 6, further comprising a fourth length member arranged in the lengthwise direction of the third length member, a second connection member having one side connected to the third length member and the other side connected to one end of the fourth length member, and a second length adjustment member connected to another end of the fourth length member, wherein a length of the fourth length member is adjusted by an operation of the second length adjustment member.

* * * * *